Nov. 10, 1942.    R. M. IVERSEN    2,301,409
VALVE AND OPERATING MEANS THEREFOR
Filed Feb. 23, 1940
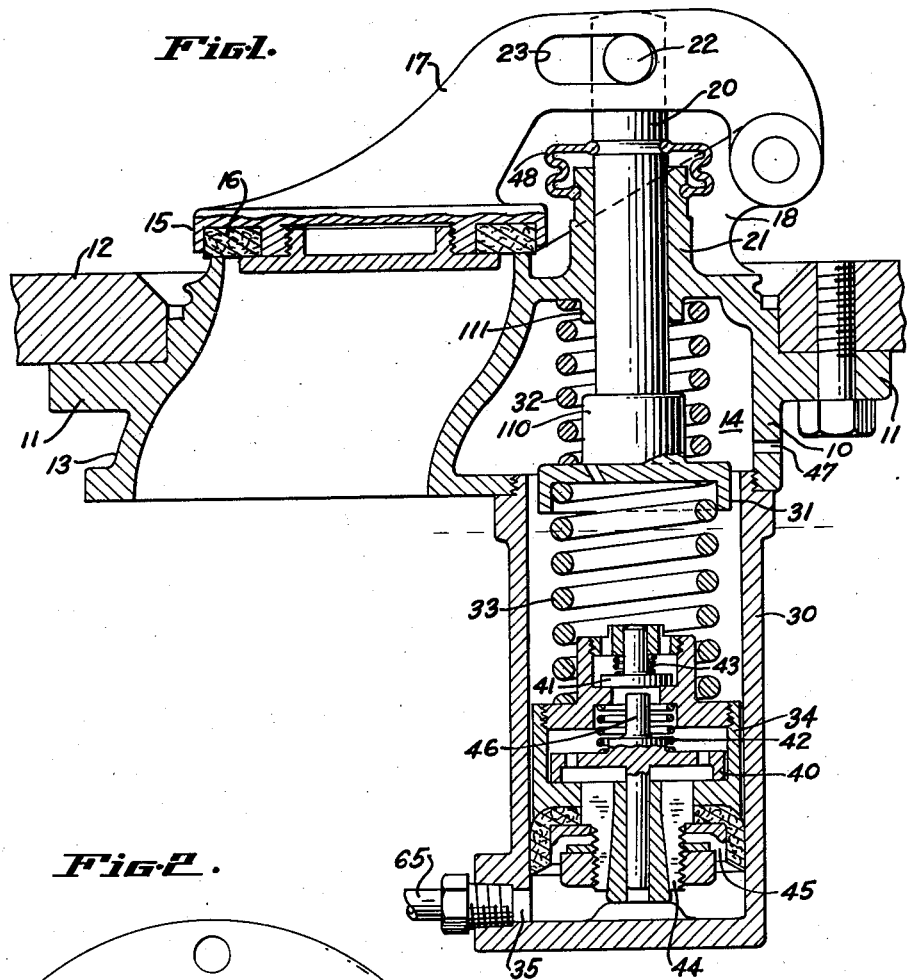
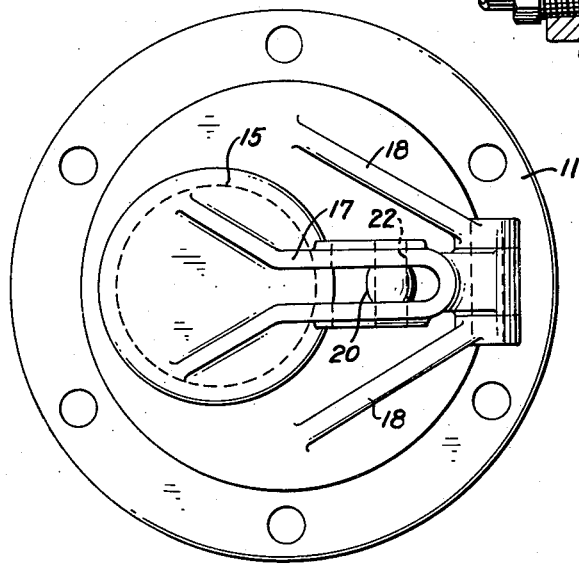
INVENTOR.
RODERICK M. IVERSEN
BY Jas. M. Naylor
ATTORNEY.

Patented Nov. 10, 1942

2,301,409

UNITED STATES PATENT OFFICE 2,301,409

VALVE AND OPERATING MEANS THEREFOR

Roderick M. Iversen, Lafayette, Calif.

Application February 23, 1940, Serial No. 320,362

4 Claims. (Cl. 251—125)

This invention relates to a valve for containers of fluids or gases and operating means therefor.

In the handling of fluids or gases, particularly in the transportation of gasoline and the like, one of the most vexatious problems has been the discharging of the substance from the container, such as a tank truck or car. This is due in no small measure to the fact that in the conventional valve mechanisms utilized little or no attempt has been made to provide a passage which is unobstructed by the gate and operating mechanism therefor. In other words, the rate of flow through such a passage is greatly affected by design of the passage and the gate and controlling mechanism associated therewith.

It is therefore an object of this invention to provide a valve for the stated purpose, the design of which will leave the passage free to discharge its smoothly bounded volume with a minimum of resistance or friction loss.

Additionally, the conventional structures utilize extremely high pressures and consequently great physical effort is required to operate them. It is an object of this invention to provide a valve and control means therefor which will require measurably less effort to operate than other and known devices.

It is another object of this invention, therefore, to provide a hydro-mechanical means for actuating the gate valve for the container of fluid or gases, more conveniently and with more facility than was heretofore thought possible.

It is a further object of this invention to provide a novel method of controlling a gate valve mechanism through the use of a non-compressible fluid medium.

These, and other objects to become more apparent as this specification proceeds, are accomplished through the provision of a gate valve actuating mechanism external of the passage being opened and closed; by the provision of a piston means for operating the gate valve actuating mechanism, which piston is moved from inoperative to operative positions by a hydraulic medium, and by the provision of means for returning the piston means for operating the gate valve mechanism and the hydraulic medium to their inoperative positions.

In the drawing forming a part hereof:

Fig. 1 is a vertical section through the gate valve actuating mechanism of this invention, and Fig. 2 is a top plan view of the subject-matter of Fig. 1.

*The hydro-mechanical tank valve*

I will first describe the hydro-mechanical tank valve illustrated in Figs. 1 and 2 of the drawing. A main valve body 10 is provided with a flange 11 for suitable attachment to a tank 12. The body element 10 includes a vent tube 13, projecting above and below the plane of the flange 11, through which gasoline or other liquids are discharged, and has a chamber 14 defined therein contiguous to the vent tube 13. A gate 15, with the usual packing 16, adapted to close the upper end of the vent tube 13, is formed at the end of an arm 17. The arm 17 is connected at its opposite end for pivotal movement between a pair of upwardly projecting members 18 integral with the main valve body 10.

A valve actuator rod 20 extends through a collar 21 formed on the main valve body 10 between the members 18 and into the chamber 14. This rod transmits the force it receives indirectly from the hydraulic medium, in a manner about to be described, to the hinged arm 17 by means of the pin 22 fast in the end of the rod 20 and the slot 23 in the arm 17 in which the pin is adapted to move. In this way the linear motion of the rod 20 and the angular motion of the arm 17 is compensated for.

While in the preferred form illustrated in the drawing a hydraulic system is utilized to actuate the rod 20 in opening and closing the gate 15, it will be appreciated that some other and less expensive means may be substituted therefor, such as a mechanical movement. This may also be desirable in some uses to which the tank valve will be put.

A pressure cylinder 30 is threadedly connected to the main valve body 10 and depends therefrom in substantial vertical co-axial alignment with the chamber 14 and collar 21. The cylinder 30 and chamber 14 are in communication and the lower end of rod 20 extends into the latter, having thereon a cup-like member 31. Normally the rod 20 is retained in its inoperative position (Fig. 1) and hence the gate 15 is closed, by means of a compression spring 32 co-axially arranged on the rod 20 and having its upper end seated in the top of the chamber 14 and its lower end seated in the top of the said cup-like member 31.

The rod 20 is moved from the thus described inoperative position to its operative position by the action of the spring 33, disposed in the cylinder 30 between the cup 31 on rod 20 and the valve piston 34, as the hydraulic medium enters port 35 in cylinder 30 from a conduit 65 under pressure sufficient to move the piston 34 upwardly in the cylinder and compress springs 32 and 33. The spring 32 is relatively weaker than the pressure spring 33, hence the first movement of piston 34 under the impulse of the hydraulic medium will compress spring 32 before compressing spring 33, and cause the rod to commence its upward movement in opening the gate 15 through the linkage above described. As the upward movement of the valve piston 34 continues, compression of spring 33 is effected to store up energy useful in maintaining the open position of the gate 15 for a long period despite any small leaks occurring in the system and to facilitate the return of the hydraulic medium to its inoperative position.

The valve piston 34 includes a bleeder valve 40 and a trap valve 41, disposed in the lower and upper halves of the piston, respectively. The bleeder valve is normally held in open position by means of the spring 42, whereas, the trap valve is normally held in its closed position by the spring 43. These valves serve to guard against air or foreign fluid matters entering the hydraulic medium from the source of valve piston 34 since the momentum of the said medium is not suddenly absorbed.

Use of the trap valve 41 is optional and a matter of individual preference. When the valve mechanism as a whole is being used in close proximity to the fluid being handled the trap valve 41 is highly desirable, but it may be otherwise eliminated.

When valve piston 34 moves upwardly under the impetus of the hydraulic medium under pressure small quantities of the hydraulic medium flow through the passes 44 and 45 in the bottom of the valve piston 34 and into the bleeder valve. As the pressure on valve piston 34 increases the piston of the bleeder valve, having venting ports therethrough, is moved upwardly, against the tension of spring 42, and the valve ports are closed to prevent further passage of oil. In this movement the trap valve 41 is opened against the urge of spring 43, by the pin 46 on the bleeder valve piston to by-pass through the ports therein such of the hydraulic medium as may have been entrapped above the bleeder valve piston. The quantity of hydraulic medium thus by-passed through the trap valve 41 enters the cylinder 30 and is commingled with that maintained above piston 34. An approximate oil level within said cylinder is indicated in dotted lines in Fig. 1. An air vent 47 is provided in chamber 14 and as a consequence thereof the oil within cylinder 30 above valve piston 34 is at atmospheric pressure. A conventional composition seal 48 is provided between the actuator rod 20 and the top of the collar 21 as a means of preventing the entry of foreign fluids into chamber 14 and the subjoined elements.

Method of operation

Assuming that it be desired to discharge a fluid medium from the tank 12, it is first necessary to overcome the load on gate 15 therein.

In the form illustrated a fluid medium under pressure is introduced into cylinder 30 through conduit 65. As the pistons 34 rise in cylinder 30 the resistance offered by the weaker springs 32 is overcome, the actuator rod 20 is moved upwardly by the force exerted through the stronger spring 33, and the opening of the gate 15 is completed. When spring 32 is fully compressed the collar 110 on cup-like member 31 will contact the annulus 111 at the top of chamber 14, thus ending upward movement of rod 20. Further upward movement of piston 34 will compress the high compression spring 33 to store up energy utilized, to return the hydraulic medium to its inoperative position. It should be noted here that in the event of leakage in the system, spring 33 will permit gate 15 to remain open for a longer period of time than would the use of a connecting rod in its place.

The closing of the gate valve 15 is effected by spring 32 upon release of pressure on the fluid medium entering through conduit 65.

The invention claimed is as follows:

1. In a gate valve actuating mechanism the combination of a valve body adapted to be connected to a tank, a vent tube in the valve body adapted to extend into the interior of the tank, a gate for the vent tube, an arm rigidly connected at one end to said gate and supported at its other end for pivotal movement, a rod reciprocally received in said valve body, said rod having an operative connection with said arm whereby reciprocation of said rod will cause said gate to be opened and closed, and yieldable means normally urging said rod into its inoperative position.

2. In a gate valve actuating mechanism the combination of a valve body adapted to be connected to a tank, a vent tube in the valve body adapted to extend into the interior of the tank, a gate for the vent tube, an arm rigidly connected at one end to said gate and supported at its other end for pivotal movement, a rod reciprocally received in said valve body, said rod having an operative connection with said arm whereby reciprocation of said rod will cause said gate to be opened and closed, yieldable means normally urging said rod into its inoperative position, and means for moving said rod into its operative position.

3. In a gate valve actuating mechanism the combination of a valve body adapted to be connected to a tank, a vent tube in the valve body adapted to extend into the interior of the tank, a gate for the vent tube, an arm rigidly connected at one end to said gate and supported at its other end for pivotal movement, a rod reciprocally received in said valve body, said rod having an operative connection with said arm whereby reciprocation of said rod will cause said gate to be opened and closed, and a coiled spring encasing said rod and having an operative connection therewith to normally urge said rod into its inoperative position.

4. In a gate valve actuating mechanism the combination of a valve body adapted to be connected to a tank, a vent tube in the valve body adapted to extend into the interior of the tank, a gate for the vent tube, an arm rigidly connected at one end to said gate and supported at its other end for pivotal movement, a rod reciprocally received in said valve body, a slot in said arm, a pin carried by said rod projecting into said slot, and yieldable means normally urging said rod into its inoperative position.

RODERICK M. IVERSEN.